(12) United States Patent
Laakso

(10) Patent No.: US 9,850,864 B2
(45) Date of Patent: Dec. 26, 2017

(54) FUEL SYSTEM AND METHOD FOR OPERATING A PISTON ENGINE

(71) Applicant: WARTSILA FINLAND OY, Vaasa (FI)

(72) Inventor: Tuukka Laakso, Vaasa (FI)

(73) Assignee: Wärtsilä Finland Oy, Vaasa (FI)

(*) Notice: Subject to any disclaimer, the term of this patent is extended or adjusted under 35 U.S.C. 154(b) by 41 days.

(21) Appl. No.: 14/895,196

(22) PCT Filed: May 22, 2014

(86) PCT No.: PCT/FI2014/050395
§ 371 (c)(1),
(2) Date: Dec. 1, 2015

(87) PCT Pub. No.: WO2014/195570
PCT Pub. Date: Dec. 11, 2014

(65) Prior Publication Data
US 2016/0123285 A1 May 5, 2016

(30) Foreign Application Priority Data

Jun. 3, 2013 (FI) .................................... 20135613

(51) Int. Cl.
*F02M 37/00* (2006.01)
*F02M 55/00* (2006.01)
(Continued)

(52) U.S. Cl.
CPC ..... *F02M 37/0076* (2013.01); *F02D 19/0621* (2013.01); *F02M 37/0023* (2013.01);
(Continued)

(58) Field of Classification Search
CPC ........... F02M 37/0076; F02M 37/0023; F02M 55/00; F02M 55/02; F02M 55/025;
(Continued)

(56) References Cited

U.S. PATENT DOCUMENTS

| 4,732,131 A | * | 3/1988 | Hensel | F02M 37/20 123/456 |
| 5,239,964 A | * | 8/1993 | Diener | F02M 69/462 123/456 |

(Continued)

FOREIGN PATENT DOCUMENTS

| EP | 0 939 220 A1 | 9/1999 |
| EP | 1 705 050 A1 | 9/2006 |

(Continued)

OTHER PUBLICATIONS

U.S. Department of Energy Methanol Benefits Oct. 13, 2004.*
(Continued)

*Primary Examiner* — Carlos A Rivera
*Assistant Examiner* — Anthony Taylor, Jr.
(74) *Attorney, Agent, or Firm* — Muncy, Geissler, Olds & Lowe, P.C.

(57) ABSTRACT

The fuel system for introducing liquid fuel into the cylinders of a piston engine has a fuel tank for storing the fuel, a pump for pressurizing the fuel, at least one fuel injector for injecting fuel into a cylinder of the engine, and a fuel pipe for supplying fuel from the pump to the fuel injector. The fuel system further has a source of inert gas and means for introducing inert gas into the fuel pipe for purging the fuel pipe.

10 Claims, 3 Drawing Sheets

(51) Int. Cl.
F02M 55/02 (2006.01)
F02D 19/06 (2006.01)
F02M 57/00 (2006.01)

(52) U.S. Cl.
CPC ............ F02M 55/00 (2013.01); F02M 55/02 (2013.01); F02M 55/025 (2013.01); F02M 57/005 (2013.01); *Y02T 10/36* (2013.01)

(58) Field of Classification Search
CPC .............. F02M 55/005; F02D 19/0621; F02D 19/0613; F02D 19/081; Y02T 10/36
USPC ........................................................ 123/445
See application file for complete search history.

(56) References Cited

U.S. PATENT DOCUMENTS

| | | | | | |
|---|---|---|---|---|---|
| 6,827,065 | B2* | 12/2004 | Gottemoller | ......... | F02M 55/002 123/198 D |
| 8,683,979 | B2* | 4/2014 | Kim | ......... | F02D 19/06 123/304 |
| 9,546,759 | B2* | 1/2017 | Van Tassel | ......... | F16L 55/1015 |
| 2002/0195088 | A1* | 12/2002 | Oprea | ......... | F02D 19/0647 123/525 |
| 2006/0236979 | A1* | 10/2006 | Stolarz | ......... | B60K 15/01 123/468 |
| 2007/0227494 | A1* | 10/2007 | Cheiky | ......... | F02M 51/04 123/304 |
| 2008/0017170 | A1* | 1/2008 | Moroi | ......... | F02M 21/00 123/456 |

FOREIGN PATENT DOCUMENTS

| | | |
|---|---|---|
| EP | 2 589 787 A1 | 5/2013 |
| JP | 55-129696 | 10/1980 |
| WO | WO 01/30670 A1 | 5/2001 |
| WO | WO 2009/110792 A1 | 9/2009 |

OTHER PUBLICATIONS

ME-GI Dual Fuel MAN B&W Engines, A Technical, Operational and Cost-effective Solution for Ships Fuelled by Gas, Brochure [online], MAN, 2012, [retrieved on Jan. 21, 2013], Retrieved from the internet: http://www.mandieselturbo.com/files/news/filesof17351/5510-0063-03pprlow.pdf—34 pp.

Maritime Safety Committee, Annex 11, Resolution MSC.285(86), [online], International Maritime Organization 2009, [retrieved on Jan. 21, 2013], Retrieved from the internet: http://www.imo.org/blast/blastDataHelper.asp?data_id=25897&filename=285%2886%29.pdf—41 pp.

Unified Requirements Concerning Machinery Installations, UR M, [online], International Association of Classification Societies 1996, [retrieved on Jan. 21, 2013] Retrieved from the Internet: http://www.iacs.org.uk/document/public/Publications/Unified_requirements/PDF/UR_M_pdf155.PDF—235 pp.

* cited by examiner

FUEL SYSTEM AND METHOD FOR OPERATING A PISTON ENGINE

TECHNICAL FIELD OF THE INVENTION

The present invention relates to a fuel system for introducing liquid fuel into the cylinders of a piston engine, as defined in the preamble of claim 1. The invention also concerns a method for operating a piston engine in accordance with the preamble of the other independent claim.

BACKGROUND OF THE INVENTION

Due to the growing need to reduce carbon dioxide emissions of internal combustion engines, engines that are capable of using renewable fuels are becoming more and more attractive. Methanol ($CH_3OH$) is an example of biofuel having a lot of potential for use as fuel of large piston engines in ships and at power plants. The use of methanol has many benefits. Since methanol is liquid at normal operating temperatures, it is easier to store than gaseous fuels. It can also be used in many engines with relatively small modifications to the engine design. In many cases, the engine can be operated on both methanol and fossil fuels, which increases flexibility. However, the use of methanol also has some drawbacks. Methanol has lower flashpoint than most other fuels that are used in large piston engines and is thus highly flammable. Methanol fires are also difficult to detect. In addition, methanol is poisonous and lethal in relatively small amounts. Therefore, when handling and using methanol, precautions are needed for preventing fires and for protecting the operators of the engine.

Risks related to the storing of methanol can be reduced by utilizing so called tank blanketing. The term refers to a process of introducing inert gas, such as nitrogen, into the vapor space of a methanol tank. When the air in the tank is replaced with inert gas, the oxygen concentration in the tank can be lowered to a level, which prevents ignition of the methanol. Also evaporation of methanol can be reduced. Tank blanketing is an effective means for protecting a fuel tank, but it does not remove the hazards relating to leakages from other parts of a fuel system.

SUMMARY OF THE INVENTION

An object of the present invention is to provide an improved fuel system for introducing liquid fuel into the cylinders of a piston engine. The characterizing features of the fuel system according to the invention are given in the characterizing part of claim 1. Another object of the invention is to provide an improved method for operating a piston engine, which is provided with a fuel pipe for supplying pressurized liquid fuel to a fuel injector. The characterizing features of the method are given in the characterizing part of the other independent claim.

The fuel system according to the invention comprises a fuel tank for storing the fuel, a pump for pressurizing the fuel, at least one fuel injector for injecting fuel into a cylinder of the engine, and a fuel pipe for supplying fuel from the pump to the fuel injector. The fuel system further comprises a source of inert gas and means for introducing inert gas into the fuel pipe for purging the fuel pipe.

In the method according to the invention, inert gas is introduced into the fuel pipe for purging the fuel pipe after shutting down the engine and/or after switching to the use of another fuel system.

With the fuel system and operating method according to the invention, residual fuel can be removed from the fuel pipe and replaced by inert gas, which improves the safety of fuel systems, in which methanol or other similar fuel is used.

According to an embodiment of the invention, the system comprises an outer pipe that is arranged around the fuel pipe for forming a fluid volume between the fuel pipe and the outer pipe and means for introducing inert gas from the gas source into the fluid volume between the fuel pipe and the outer pipe. The inert gas in the space surrounding the fuel space effectively prevents fires relating to leaking fuel, which further improves the safety of the system.

Part of the fuel pipe can form a fuel rail to which a plurality of fuel injectors is connected and which is surrounded by the outer pipe.

According to an embodiment of the invention, the system comprises means for measuring pressure in the fuel pipe. The system can also comprise means for measuring pressure in the outer pipe. By measuring pressure in the fuel pipe and in the outer pipe, leakages can be detected and it can be ensured that the fluid volume between the pipes is properly filled with inert gas.

According to an embodiment of the invention, the system comprises means for introducing inert gas into the fuel tank. By introducing inert gas into the fuel tank, ignition of fuel in the tank can be effectively prevented.

According to an embodiment of the invention, the system comprises a first discharge valve for discharging fluid from the fuel pipe into the outer pipe and a second discharge valve for discharging fluid from the outer pipe.

According to an embodiment of the invention, the method comprises a step of measuring pressure in the fluid volume and starting fuel supply into the fuel pipe only on the condition that the pressure is within a predetermined range. This ensures that the engine is not started when there is a failure in the protective system.

According to an embodiment of the invention, pressure in the fuel pipe is measured and engine operation on the fuel that has been supplied into the fuel pipe is started only on the condition that the pressure is within a predetermined range. This is a safety measure for checking whether the fuel pipe is leaking.

The inert gas used in the invention is preferably nitrogen. The invention is particularly suitable for engines using methanol as fuel.

BRIEF DESCRIPTION OF THE DRAWINGS

Embodiments of the invention are described below in more detail with reference to the accompanying drawings, in which.

DESCRIPTION OF EMBODIMENTS OF THE INVENTION

In FIGS. 1 to 4 is shown a fuel system of a piston engine. The fuel system can be used for storing liquid fuel and for introducing the fuel into the cylinders of the engine. The fuel system is particularly suitable for methanol, but could also be used for injecting other alcoholic or other liquid fuel into the cylinders of the engine. The engine is a large internal combustion engine, such as a main or an auxiliary engine of a ship or an engine that is used at a power plant for producing electricity. In the embodiment of the figures, the engine comprises seven cylinders that are arranged in line, but the engine could comprise any reasonable number of cylinders. The cylinders could also be arranged in some other way, for example in a V-configuration. In addition to the fuel system of the figures, the engine can comprise one or more additional fuel systems. For instance, the engine can be provided with an additional fuel system for different liquid fuel and/or an additional fuel system for gaseous fuel. If the engine comprises an additional fuel system for liquid fuel, the additional fuel system can be either a common rail system or it can be provided with individual fuel injection pumps for each cylinder of the engine.

Figure 1:
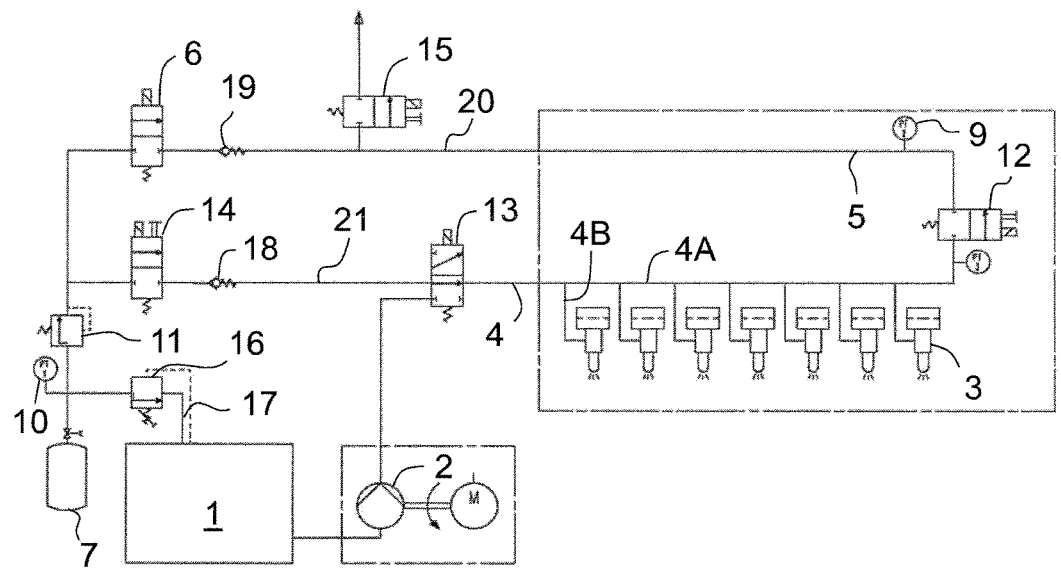
FIG. 1 shows a simplified illustration of a fuel system of an internal combustion engine in a standby mode.
Figure 2:
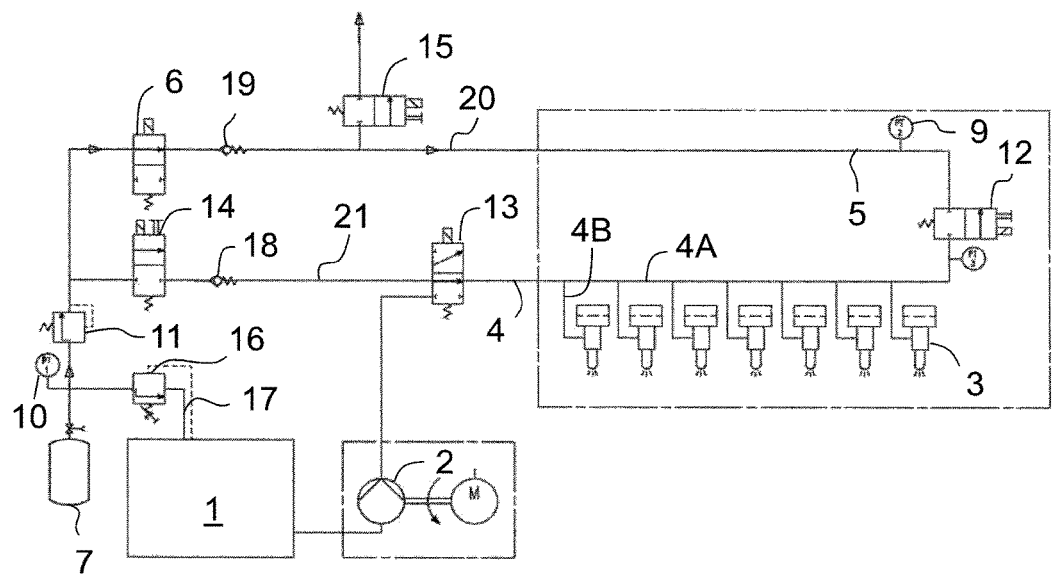
FIG. 2 shows the fuel system of FIG. 1 when the protective space of the system is filled with inert gas.
Figure 3:
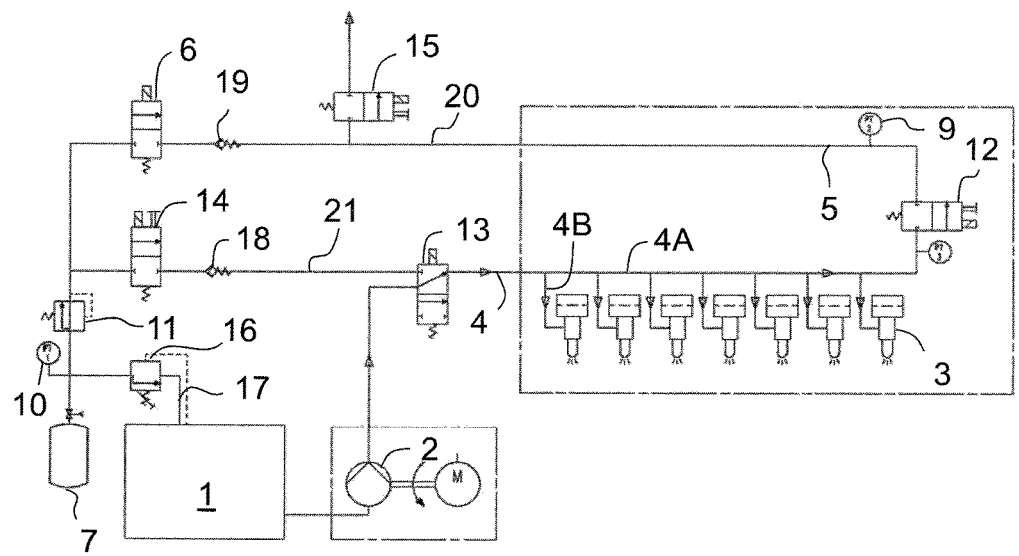
FIG. 3 shows the fuel system of FIG. 1 when the engine is operated using the fuel system.
Figure 4:
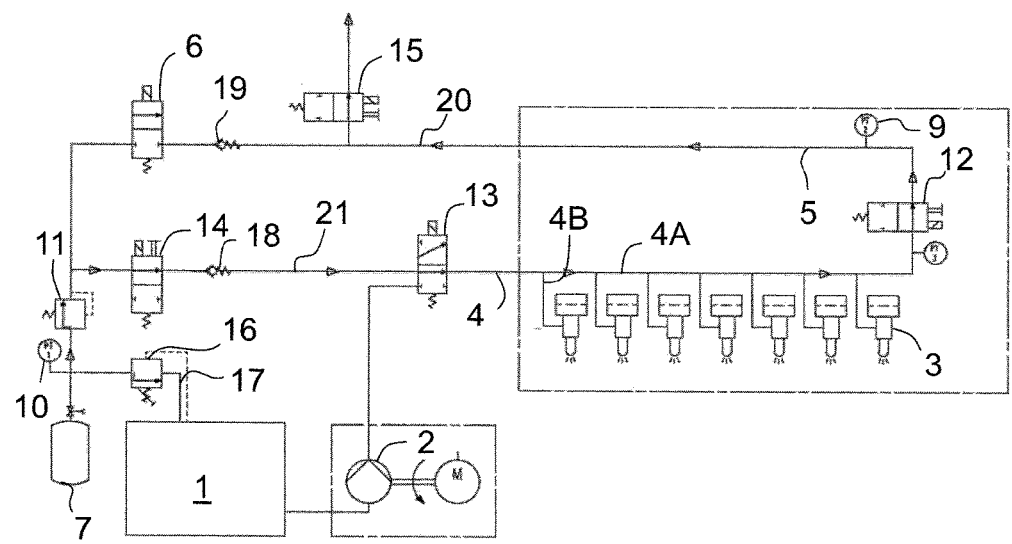
FIG. 4 shows the fuel system of FIG. 1 when the fuel pipe of the fuel system is purged.
Figure 5:
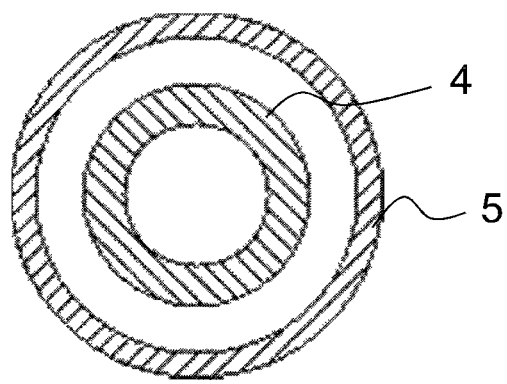
FIG. 5 shows a cross-sectional view of a fuel pipe and an outer pipe.

The fuel system of the figures comprises a fuel injector 3 for each cylinder of the engine. If the engine is provided with an additional fuel system for liquid fuel, the additional fuel system is provided with its own fuel injectors. However, both fuel injectors of each cylinder can be integrated into a common injector body. The fuel system is provided with a fuel tank 1 for storing methanol. From the fuel tank 1, the methanol is supplied by means of a pump 2 into a fuel pipe 4, from which it is delivered to the fuel injectors 3. Only one pump 2 is shown, but the fuel system can comprise a low-pressure pump, which supplies fuel from the fuel tank 1 at a relatively low pressure to at least one high-pressure pump, from which the fuel is distributed to the fuel injectors 3. The fuel system can be provided with several high-pressure pumps. For instance, one high-pressure pump can be provided for the fuel injectors of each bank in a V-engine, or a group of fuel injectors can be provided with a common high-pressure pump. Instead of electrical pumps, the pumps could also be driven by the engine. The fuel system could also be provided with conventional fuel injection pumps. The fuel system can thus comprise a fuel injection pump for each cylinder of the engine. In addition, there can be a low-pressure pump for feeding the fuel injection pumps. The fuel system could also comprise several low-pressure pumps. Part of the fuel pipe 4 forms a fuel rail 4A. The fuel injectors 3 are connected to the fuel rail 4A by branches 4B of the fuel pipe 4. If the fuel system is provided with conventional fuel injection pumps, the fuel rail 4A is not needed. It is also possible to provide the fuel system with several fuel rails 4A. For instance, in a V-engine there can be one fuel rail 4A for each bank of the engine. Instead of a single fuel rail 4A, each fuel injector 3 or a group of fuel injectors 3 could be provided with an own pressure accumulator for storing fuel. Fuel supply from the pump 2 to the fuel pipe 4 is controlled by a fuel valve 13. The fuel valve 13 is a 3/2-valve having three ports and two positions. The fuel valve 13 is electrically controlled. In a first position of the fuel valve 13, as shown in FIGS. 1, 2 and 4, flow from the pump 2 to the fuel pipe 4 is prevented. In a second position of the fuel valve 13, as shown in FIG. 3, flow from the pump 2 to the fuel pipe 4 is allowed.

The fuel system is provided with a nitrogen tank 7, which works as a source of inert gas. Gaseous nitrogen ($N_2$) is stored in the nitrogen tank 7 under pressure. The nitrogen tank 7 is connected to the fuel tank 1 with a blanketing duct 17 and a blanketing valve 16. Through the blanketing duct 17 and the blanketing valve 16, nitrogen can be introduced into the fuel tank 1. The nitrogen displaces air in the fuel tank 1 and removes thus one of the prerequisites for the ignition of the methanol. The blanketing valve 17 is an automatic pressure-controlled valve. When the pressure in the fuel tank 1 drops before a threshold value, the blanketing valve 16 opens and allows more nitrogen to flow into the fuel tank 1. The outflow of fuel from the fuel tank 1 is thus automatically compensated. A pressure sensor 10 is arranged to measure the pressure in the nitrogen tank 7. If the pressure in the nitrogen tank 7 is too low for ensuring proper blanketing of the fuel tank 1, engine operation on methanol is prevented by the control system of the engine.

The fuel rail 4A is surrounded by an outer pipe 5. The inner diameter of the outer pipe 5 is greater than the outer diameter of the fuel rail 4A, and an empty space is thus formed between the fuel rail 4A and the outer pipe 5. The empty space between the fuel rail 4A and the outer pipe 5 works as a fluid volume. The fluid volume is connected to the nitrogen tank 7 with a filling duct 20 and a control valve 6. The control valve 6 is used for opening and closing fluid communication between the nitrogen tank 7 and the outer pipe 5. Nitrogen can thus be introduced into the fluid volume between the fuel rail 4A and the outer pipe 5 through the filling duct 20. When the control valve 6 is in the position shown in FIGS. 1, 3 and 4, flow into the outer pipe 5 is prevented. A check valve 19 is arranged in the filling duct 20 downstream from the control valve 6 for preventing backflow from the outer pipe 5 to the nitrogen tank 7. The fuel system is provided with a pressure sensor 9 for monitoring pressure in the outer pipe 5. A pressure regulating valve 11, which is arranged between the nitrogen tank 7 and the control valve 6, controls the pressure in the filling duct 20. If the pressure in the filling duct 20 exceeds a threshold value, the pressure regulating valve 11 is automatically closed and prevents nitrogen flow into the filling duct 20. Although the figures show only the fuel rail 4A as a double wall construction, preferably the whole fuel pipe 4, including the branches 4B between the fuel rail 4A and the fuel injectors 3, are provided with an outer pipe 5.

The fuel system is further provided with a purging duct 21 for introducing nitrogen into the fuel pipe 4. The purging duct 21 is thus connected to the nitrogen tank 7 and to the fuel pipe 4. The purging duct 21 is provided with a purging valve 14 for opening and closing fluid communication between the fuel pipe 4 and the nitrogen tank 7. The purging valve 14 can be operated both electrically and manually. The purging duct 21 further comprises a check valve 18, which is arranged downstream from the purging valve 14 for preventing flow from the fuel pipe 4 to the nitrogen tank 7. The purging duct 21 is connected to one of the ports of the fuel valve 13. When the fuel valve 13 is in the first position, which is shown in FIGS. 1, 2 and 4, the fluid communication between the purging duct 21 and the fuel pipe 4 is open. In the second position of the fuel valve 13, which is shown in FIG. 3, the fluid communication between the purging duct 21 and the fuel pipe 4 is closed. It is thus not possible to introduce both fuel and inert gas into the fuel pipe 4 at the same time. For discharging methanol and nitrogen from the fuel pipe 4, the fuel system is provided with a first discharge valve 12 and with a second discharge valve 15. The first discharge valve 12 is arranged between the fuel rail 4A and the outer pipe 5. The first discharge valve 12 is normally closed, but may be opened for releasing methanol from the fuel rail 4 into the outer pipe 5. The second discharge valve 15 is arranged in connection with the outer pipe 5. Also the second discharge valve 15 is normally closed. Through the second discharge valve 15, methanol and nitrogen can be discharged from the outer pipe 5. The first discharge valve 12 and the second discharge valve 15 can be operated both electrically and manually.

The operation of the engine is described next. The pressure in the nitrogen tank 7 is continuously monitored by means of the pressure sensor 10. If the pressure in the nitrogen tank 7 is below a predetermined threshold value, engine operation on methanol is not started. The pressure needs to be high enough for ensuring proper blanketing of the fuel tank 1 and for complete purging of the fuel pipe 4. If the pressure in the nitrogen tank drops during operation on methanol below a predetermined threshold value, the engine is shut down, or if other fuel is available, the engine is switched to an operation mode, in which the alternative fuel is used. By this procedure, it can be ensured that the tank blanketing and purging system works properly for safe operation of the engine.

Before starting operation of the engine on methanol, the control valve 6 is switched to the open position, which is shown in FIG. 2. Nitrogen can thus flow from the nitrogen tank 7 into the outer pipe 5. The pressure in the outer pipe 5 rises until it reaches the set value of the pressure regulating valve 11. The pressure is preferably set to be approximately 7 to 20 bar. When the fluid volume has been filled with nitrogen, the control valve 6 can be closed. The pressure in the outer pipe 5 is monitored by the pressure sensor 9. If the pressure in the outer pipe 5 is not within a predetermined range, the operation on methanol is not started. The methanol in the fluid volume between the fuel rail 4A and the outer pipe 5 increases the safety of the fuel system. Since the oxygen concentration in the fluid volume is much lower than the oxygen concentration in air, ignition of methanol is prevented even in the case of fuel leakage from the fuel rail 4A into the outer pipe 5. The fuel system includes a pressure sensor 8 for measuring pressure in the fuel rail 4A. If the pressure in the fuel rail 4A is the same as the pressure in the outer pipe 5, this is an indication of a leakage between the fuel rail 4A and the outer pipe 5. Engine operation is thus started only on the condition that the pressure in the fuel rail 4A is within a predetermined range, which differs from the pressure in the outer pipe 5.

When the engine is shut down or switched to operating on different fuel, the fuel rail 4 is emptied from methanol. When the fuel valve 13 is switched to the first position for preventing fuel flow from the pump 2 into the fuel pipe 4, the fuel valve 13 allows flow from the purging duct 21 into the fuel pipe 4. Also the purging valve 14 is opened, and nitrogen can flow from the nitrogen tank 7 into the purging duct 21 and further into the fuel pipe 4. The first discharge valve 12 is opened for allowing the mixture of methanol and nitrogen to flow from the fuel rail 4A into the outer pipe 5. Also the second discharge valve 15 is opened, and the mixture is thus discharged from the outer pipe 5. The valve positions are shown in FIG. 4. The purging valve 14 is kept open for a sufficient amount of time for allowing the fuel pipe 4 and the outer pipe 5 to be flushed with nitrogen. The fuel pipe 4 is thus completely emptied from the methanol, and no flammable fluids remain in the fuel pipe 4 when the engine is shut down or operated on different fuel.

It will be appreciated by a person skilled in the art that the invention is not limited to the embodiments described above, but may vary within the scope of the appended claims. For instance, although the invention has been described above in connection with an engine that is operated on methanol, it is obvious that the invention could also be utilized in connection with engines, which are operated on some other liquid fuel having similar properties as methanol.

The invention claimed is:

1. A fuel system for introducing liquid fuel into a cylinder of a piston engine, the fuel system comprising:
   a fuel tank for storing the fuel;
   a pump for pressurizing the fuel;
   at least one fuel injector for injecting fuel into the cylinder of the engine, and a fuel pipe for supplying fuel from the pump to the at least one fuel injector;
   a source of inert gas;
   a means for introducing inert gas into the fuel pipe for purging the fuel pipe;
   an outer pipe that is arranged around the fuel pipe for forming a fluid volume between the fuel pipe and the outer pipe;
   a means for introducing inert gas from the source of inert gas into the fluid volume between the fuel pipe and the outer pipe; and
   a first discharge valve for discharging fluid from the fuel pipe into the outer pipe and a second discharge valve for discharging fluid from the outer pipe.

2. The fuel system according to claim 1, wherein part of the fuel pipe forms a fuel rail to which a plurality of fuel injectors is connected and which is surrounded by the outer pipe.

3. The fuel system according to claim 1, wherein the system comprises a means for measuring pressure in the outer pipe.

4. The fuel system according to claim 1, wherein the system comprises a means for measuring pressure in the fuel pipe.

5. The fuel system according to claim 1, wherein the system comprises a means for introducing inert gas into the fuel tank.

6. A method for operating a piston engine, wherein the engine is provided with a fuel pipe for supplying pressurized liquid fuel to a fuel injector, the method comprising:
   introducing inert gas into the fuel pipe for purging the fuel pipe after shutting down the engine and/or after switching to the use of another fuel system, the engine is provided with an outer pipe that is arranged around the fuel pipe for forming a fluid volume between the fuel pipe and the outer pipe;
   a mixture of fuel and inert gas from the fuel pipe is discharged into the outer pipe, and
   before introducing fuel into the fuel pipe, introducing inert gas into the fluid volume between the fuel pipe and the outer pipe.

7. The method according to claim 6, wherein pressure in the fluid volume is measured and fuel supply into the fuel pipe is started only on the condition that the pressure is within a predetermined range.

8. The method according to claim 7, wherein pressure in the fuel pipe is measured and engine operation on the fuel that has been supplied into the fuel pipe is started only on the condition that the pressure is within a predetermined range.

9. The method according to claim 6, wherein the inert gas is nitrogen.

10. The method according to claim 6, wherein the fuel is methanol.

* * * * *